United States Patent
Beerens et al.

(10) Patent No.: US 10,272,496 B2
(45) Date of Patent: Apr. 30, 2019

(54) METHOD FOR PRODUCING A VALVE SEAT RING

(71) Applicant: Mahle International GmbH, Stuttgart (DE)

(72) Inventors: Christoph Beerens, Stuttgart (DE); Heiko Heckendorn, Schopfheim (DE); Roland Scholl, Laufenburg (DE); Klaus Wintrich, Schopfheim (DE)

(73) Assignee: Mahle International GmbH (DE)

( * ) Notice: Subject to any disclaimer, the term of this patent is extended or adjusted under 35 U.S.C. 154(b) by 359 days.

(21) Appl. No.: 15/190,135

(22) Filed: Jun. 22, 2016

(65) Prior Publication Data

US 2016/0375494 A1 Dec. 29, 2016

(30) Foreign Application Priority Data

Jun. 23, 2015 (DE) .................. 10 2015 211 623

(51) Int. Cl.
*F01L 3/02* (2006.01)
*F16K 25/00* (2006.01)
(Continued)

(52) U.S. Cl.
CPC ............. *B22F 7/02* (2013.01); *B22F 1/0062* (2013.01); *B22F 3/16* (2013.01); *B22F 5/02* (2013.01);
(Continued)

(58) Field of Classification Search
CPC ........ B22F 2998/10; B22F 9/08; B22F 9/026; B22F 9/04; B22F 2003/023; B22F 3/1021;
(Continued)

(56) References Cited

U.S. PATENT DOCUMENTS

| 2,753,858 A | 7/1956 | Honeyman et al. |
| 4,346,684 A * | 8/1982 | Vossieck .............. B22F 7/06 123/188.8 |

(Continued)

FOREIGN PATENT DOCUMENTS

| DE | 2535665 A1 | 2/1977 |
| DE | 2918248 A1 | 11/1980 |

(Continued)

OTHER PUBLICATIONS

European Search Report dated Mar. 3, 2017 related to corresponding European Application No. 16 17 2261.

*Primary Examiner* — Ryan J. Walters
*Assistant Examiner* — Lawrence Averick
(74) *Attorney, Agent, or Firm* — Fishman Stewart PLLC

(57) ABSTRACT

A valve seat ring and a method for producing the same may include a first material and a second material. The first material may be composed of approximately 15 to 30% by weight of Mo, approximately 5 to 30% by weight of chromium, approximately 0 to 5% by weight of Si, approximately 0 to 2% by weight of C, and up to 5% by weight of other elements and a portion of Co. The second material may be composed of approximately 10 to 12% by weight of Cr, approximately 0.5 to 0.8% by weight of Mn, approximately 0.5 to 1% by weight of Si, approximately 0.5 to 0.9% by weight of C, up to approximately 3% by weight of other elements and a reminder of Fe.

15 Claims, 3 Drawing Sheets

(51) Int. Cl.

| | |
|---|---|
| *C22C 38/18* | (2006.01) |
| *C22C 38/04* | (2006.01) |
| *C22C 19/07* | (2006.01) |
| *B22F 5/10* | (2006.01) |
| *C22C 33/02* | (2006.01) |
| *B22F 7/02* | (2006.01) |
| *B22F 7/06* | (2006.01) |
| *C22C 1/04* | (2006.01) |
| *B22F 1/00* | (2006.01) |
| *B22F 3/16* | (2006.01) |
| *B22F 5/02* | (2006.01) |
| *B22F 9/08* | (2006.01) |
| *C22C 38/02* | (2006.01) |

(52) U.S. Cl.
CPC ............ *B22F 5/106* (2013.01); *B22F 7/06* (2013.01); *B22F 9/082* (2013.01); *C22C 1/0433* (2013.01); *C22C 19/07* (2013.01); *C22C 33/0285* (2013.01); *C22C 38/02* (2013.01); *C22C 38/04* (2013.01); *C22C 38/18* (2013.01); *F01L 3/02* (2013.01); *F16K 25/005* (2013.01); *B22F 1/0011* (2013.01); *B22F 2301/15* (2013.01); *B22F 2301/35* (2013.01); *B22F 2304/10* (2013.01); *B22F 2998/10* (2013.01); *F01L 2101/00* (2013.01); *F01L 2103/00* (2013.01)

(58) Field of Classification Search
CPC ......... B22F 3/1017; B22F 7/02; B22F 9/082; B22F 5/02; B22F 3/16; B22F 1/0062; B22F 5/106; B22F 7/06; B22F 2301/35; B22F 2301/15; B22F 1/0011; B22F 2304/10; F01L 3/02; F01L 2103/00; F01L 2101/00; C22C 38/04; C22C 38/18; C22C 19/07; C22C 38/02; C22C 1/0433; C22C 33/0285; F16K 25/005
See application file for complete search history.

(56) References Cited

U.S. PATENT DOCUMENTS

| | | | |
|---|---|---|---|
| 4,424,953 A * | 1/1984 | Takagi | B22F 7/06 |
| | | | 123/188.8 |
| 4,509,722 A | 4/1985 | Ebihara | |
| 4,546,737 A | 10/1985 | Kazuoka et al. | |
| 4,566,737 A | 1/1986 | Masaki et al. | |
| 8,733,313 B2 * | 5/2014 | Sato | C22C 1/0491 |
| | | | 123/188.8 |
| 9,714,709 B2 * | 7/2017 | Zhao | F16J 15/102 |
| 2008/0146467 A1 * | 6/2008 | Takayama | B22F 3/1035 |
| | | | 508/105 |
| 2011/0023808 A1 * | 2/2011 | Sato | C22C 1/0491 |
| | | | 123/188.8 |
| 2015/0152753 A1 * | 6/2015 | Hashimoto | C22C 33/0285 |
| | | | 251/359 |
| 2015/0322828 A1 | 11/2015 | Kohler et al. | |
| 2016/0146350 A1 * | 5/2016 | Zhao | F16J 15/102 |
| | | | 277/312 |
| 2017/0096719 A1 * | 4/2017 | Valls Angles | C21D 6/005 |

FOREIGN PATENT DOCUMENTS

| | | |
|---|---|---|
| DE | 2918248 B2 | 5/1981 |
| EP | 2870328 A1 | 5/2015 |

* cited by examiner

METHOD FOR PRODUCING A VALVE SEAT RING

CROSS-REFERENCE TO RELATED APPLICATIONS

This application claims priority to German Patent Application No. 10 2015 211 623.9, filed Jun. 23, 2015, the contents of which are hereby incorporated by reference in its entirety.

TECHNICAL FIELD

The invention relates to a method for producing a valve seat ring, out of a first material and a second material. The invention additionally relates to a valve seat ring produced according to this method.

BACKGROUND

In Thomazic, A. . . . Kamdem, Y.: "Fabrication of Bimaterial Components by Conventional Powder Metallurgy", PM2010 World Congress—Tools for Improving PM II-Design Test & Evaluation; Bouvard, Didier (Grenoble INP/CNRS) "Fabrication of Bimaterial Components by Conventional Powder Metallurgy", Vol.5, p.25, the powder-metallurgical production of bimaterials, i.e. components, which are constructed of two different materials, is thoroughly described. Accordingly, it is possible to fill powder of two different materials into a cavity one after the other and then jointly process these into a manageable body (green compact). In the described case, a hard and solid component of iron-based WC-hard metal (WC-Fe) is used as first material and a tough iron-based material (Fe) as second material. Compaction at 600 MPa in the case of WC-Fe material for example results in a green density of 69% TD and in the case of the Fe-rich material in 74% TD (TD: theoretical density of the material). After the joint uniaxial pressing at 600 MPa, a moulded body is created which after the sintering permits a solid composite of both materials. In order to evaluate the suitability of the press-ready granulates used and in order to understand the formation of the composite of the two materials, density curves were measured. The selected powder compositions were selected on the one hand so that the initial material densities differ only slightly and these increase to an approximately same density end value during the sintering.

It can be observed that the curves of the density change significantly differ in the range of medium temperatures. Of necessity, this must lead to mechanical stresses in the region of the bond of both materials.

Furthermore it is described that it is relevant which of the two materials was filled into the cavity first during the creation of a layer-pressed body, which indicates material interactions among the materials and with the die.

However, the evaluation of the density distribution following the pressing and the cracks observed in the component after the sintering show that the powder-technological production of valve seat rings from two materials can be technically mastered only with difficulty. Nevertheless, there are numerous applications in which such material combinations would offer technical advantages.

SUMMARY

The present invention therefore deals with the problem of stating an improved method by means of which valve seat rings can be produced from two materials, without the disadvantages known from the prior art.

According to the invention, this problem is solved through the subject of the independent claim(s). Advantageous embodiments are subject of the dependent claims.

The present invention is based on the general idea that for producing a valve seat ring a function material is first selected, which has already proved itself as valve seat ring, in particular under harsh operating conditions in the cylinder head of an internal combustion engine. In a next step, a second material is selected, which during the powder-technological processing—in particular by way of sintering—permits a bond with the first material without damage in the joining zone and which, because of its mechanical properties, such as adequate heat resistance, similar expansion coefficient etc., can act as carrier of the first (function) material. In that according to the invention fine powders are produced and granulated from both materials, the technical prerequisites are provided to produce a corresponding bimaterial as layer component by way of pressing and sintering. According to the invention, the first material comprises approximately 15 to 30% by weight of molybdenum, approximately 5 to 30% by weight of chromium, 0 to 5% by weight of silicon, 0 to 2% by weight of carbon, and up to 5% by weight of other elements and the residual proportion of cobalt, and the second material approximately 10-12% by weight of Cr, 0.4-0.8% by weight of Mn, 0.5-1% by weight of Si, 0.5-0.9% by weight of C, approximately 3% by weight of other elements and remainder Fe.

The two materials are produced by atomising a metal melt, as a result of which they reach a mean particle size of approximately 5 to 13 µm. Following this, the powdery materials are each processed into a flowable granulate with a granulate size of substantially smaller than <300 µm, preferentially <150 µm, and of greater than 15 µm, in particular processed by way of fluidised bed granulation, spray drying or screen granulation, wherein a proportion of 1 to 5% by weight, in particular of 4% by weight of organic pressing additives, in the form of a long-chain hydrocarbon (paraffin), which inter-binds the particles and simultaneously facilitates the sliding-off of the powder particles mutually and with respect to the wall of the pressing die, is introduced. Both granulates are now filled into a press tool one after the other and subsequently pressed in a single axis with a pressing pressure p of 400<p<700 MPa, during which the organic pressing additives are removed by heating at 50° C.<t<700° C. The valve seat ring is now pre-sintered and subsequently finish-sintered, wherein pre-sintering is performed in particular at a temperature t of 1,110° C.<t<1,130° C. and subsequently finish-sintered at a temperature t of approximately 1,240° C.

In a particularly preferred embodiment, an alloy is selected as first material containing the following elements: 23% by weight of Mo, 16% by weight of Cr, 1% by weight of Si, 2% by weight of Fe, 0.5% by weight of C, approximately 3% by weight of other elements and rest Co. As second material, an alloy is selected which contains 11% by weight of Cr, 0.6% by weight of Mn, 0.7% by weight of Si, 0.7% by weight of C, approximately 2% by weight of other elements and rest Fe. These are worked into fine powders through known methods with a mean particle size of approximately 5 to 13 µm by way of atomising a metal melt. Once these powders have been processed into a freely flowable granulate (filling density: approximately 2.4 g/cm³; granulate size: <150 µm (100 mesh) and preferentially of greater than 15 µm, with a proportion of 1 to 5% by weight of organic components (pressing additives), both powders are filled into a press tool (ring) one after the other and then jointly pressed uniaxially at a pressing pressure p of 400 to 700 MPa. Depending on the pressing pressure used, they reach a relative material density in the individual layers of 65 to approximately 80% TD (TD: theoretical density of the material). In order to produce such materials corresponding to the minimum requirements made on the application (high strength, no open porosity), they are first freed of binders (removing the organic additives, in particular the pressing aid in a temperature range from 50° C. to approximately 700° C.) and sintered so that both components at least reach a density of 93% TD (TD: theoretical density of the material). In order to ensure this, a linear shrinkage of approximately 6 to 12% is required. During the "sintering", the particles move more closely together and remain in this position. This is accompanied by a change of the length in all space directions, here by 6-12%. With the same mass (binder is removed), the volume is reduced and thereafter the density increased up to the stated values >93% TD. In the process, cavities (pores) between the particles are greatly reduced, 7 to 0%, which corresponds to a density of 93 to 100% TD. When in addition to this a interface is present between the materials which does not have any damage (cracks, hard or brittle bonds), the reliable powder-technological production of a valve seat ring from two different materials has been realised.

In addition to the actual production of the bimaterial component, the combination of a material of a Co-based alloy and an Fe-based material described above additionally supplies a surprising and thus unexpected advantage with respect to the technically utilised version of cast valve seat rings made of Co-alloys according to the prior art. Through the skilful combination of these materials, namely a "simple, cost-effective, less heat-resistant" and a "complex, expensive and heat-resistant", which differ in the linear thermal expansion coefficient (CTE), the heat conductivity (WLF), the modulus of elasticity and shear modulus and the creep characteristics in the region of the application temperatures in the desired manner it is achieved that the valve seat ring supplies better function characteristics than the cast Co-based materials that have been considered particularly suitable for the application in the past. This manifests itself in the comparison of the relaxation behaviour—i.e. the change of the shape and size of the valve seat ring during the course of the technical use—of the pure function material (first material) on Co-basis (cast or sintered) to the sintered Co-base/Fe-base valve seat ring (bimaterial) with same operating conditions.

In detail, the "overlap" of the valve seat ring compared with the pure function material decreases less severely through the material combination used, which provides greater security against the valve seat ring "falling out" (press fit) from the mounting bore of the cylinder head as a consequence of the relaxation.

In the concrete case, for example in the case of an exhaust valve of an internal combustion engine, it is required to press the valve seat ring (VSR) into a prefabricated and exactly positioned bore of the cylinder head. After the production, valve seats ring have a defined larger diameter (+20 to approximately +80 μm)—also called "overlap"—than the bore. For the installation of the VSR the valve seat ring for example is cooled down so far that its "cold" diameter is smaller than the diameter of the bore in the "warm" state. Accordingly, it can be easily pressed into the prepared bore. Following the equalisation of the temperature of VSR and cylinder head, the VSR is in a press fit in a pre-calculated state of stress and thus secured against falling out. This stress changes during the operation of the internal combustion engine because of the complex load state with the heat flow, which via valve and VSR, flows into the cylinder head, with the thermal expansion coefficients (CTE), the moduli of elasticity and shear, with the heat conductivities and the remaining temperature-dependent mechanical properties (strength, creep behaviour) and in this way leads to a stress-induced change of shape during the operation, also called relaxation here. Through this relaxation, the residual stress state of the VSR changes, while a homogeneous material differs substantially from one that is constructed in layers, as is described in this invention.

Further important features and advantages of the invention are obtained from the subclaims, from the drawings and from the associated figure description with the help of the drawings.

It is to be understood that the features mentioned and still to be explained in the following cannot only be used in the combination stated but also in other combinations or by themselves without leaving the scope of the present invention.

BRIEF DESCRIPTION OF THE DRAWINGS

Preferred exemplary embodiments of the invention are shown in the drawing and are explained in more detail in the following description, wherein same reference numbers relate to same or similar or functionally same components. There it shows, in each case schematically FIG. 1 comparison of the form of layered compacts following the removal of the binder/pre-sintering (on the right) and following the tight-sintering (left); the Co-based alloy (first material) is located at the top, the Fe-based (second material) at the bottom, FIG. 2 structure of the sintered layer composite: iron-based material (top), transition region between iron base and cobalt base (middle) and function material cobalt base (bottom) after the sintering, FIG. 3 iron-based material in different enlargements (top) and transition zone between iron base and cobalt base (bottom) after the sintering, FIG. 4 engine-based relaxation test of a sintered first material (cobalt base), FIG. 5 engine-based relaxation test of a cast cobalt-based material, FIG. 6 engine-based relaxation test of a sintered composite material between cobalt base and unsuitable iron base material.

DETAILED DESCRIPTION

Figure 1:
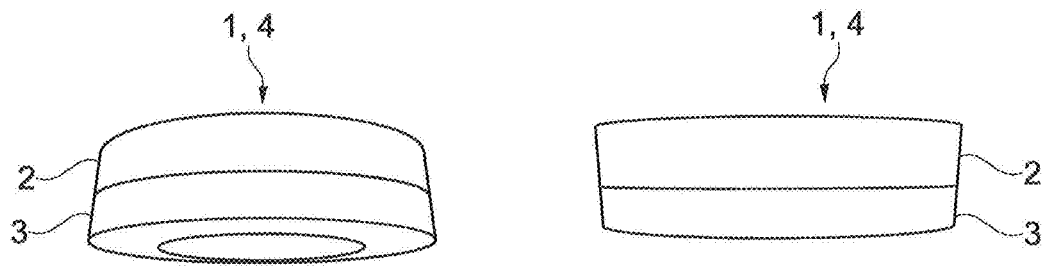

A composite component 1, in particular a valve seat ring 4, can be produced with the method according to the invention for example as follows: initially, granulates of a Co-base material (first material 2) and an Fe-base material (second material 3) are obtained by atomising a metal melt and then filled into an annular press tool φa=50 mm, φi=35 mm. To this end, approximately 40 g of the Co-based granulate and approximately 37 g of the Fe-based granulate are filled into the cavity of the press tool one after the other and pressed at a pressure of 520 MPa. At this pressure, the Co-based powder (first material 2) reaches a material density of 5.85 g/cm3 (67% TD) and the Fe-based powder (second material 3) 5.5 g/cm3 (70.5% TD).

Parallel to the valve seat rings 4 according to the invention (layered compacts), moulded bodies of the pure powders, or granulates, were produced as reference in order to obtain information regarding the free sintering—without any obstruction through the interaction with the composite partner.

In a first step, the following takes place in a technical continuous furnace (heating-up: 3 to 5 K/min; Tsinter: 1110 to 1130° C.; holding time: approximately 25 to 35 min; atmosphere; N2-H2 (5 to 20% H2), cooling-down to room temperature: 5 to 10 K/min) the removal of the organic additives and the "pre-sintering" (for improving the manageability) of the moulded bodies. In a second step, finish-sintering takes place (heating-up: 5 to 10 K/min; Tmax: 1240° C.; holding time: 50-60 min; cooling-down to room temperature: approximately 20 to 10 K/min; atmospheres: N2-H2 (5 to 20% H2): RT up to 1100° C., vacuum: from 1100 to 1240° C., cooling-down: (5 to 20% H2)).

The evaluation for the Co-base reference sample yielded a sinter density of 8.2 to 8.55 g/cm3 (94 to approximately 98% TD). The hardness (HRC) amounted to 45 and 53. The Fe-based reference material reached a sinter density of 7.2 to 7.6 g/cm3 (92 to 97% TD) and hardness values (HRC) of 49 to 50, wherein in both cases the differences were attributable to the position and thus the actual sinter temperature and active sinter time.

During the sintering process the layer press bodies (valve seat ring 4) exhibit a change in shape. In the case of the selected system, a reversal of the shrinkage difference from pre-sintering (1120° C.) to tight sintering (1240° C.) occurs, which is visible by the reversing conicity in FIG. 1. After the pre-sintering (FIG. 1 right), a slightly greater shrinkage of the Fe-based region (second material 3) was present, following the tight sintering, the shrinkage of the Co-based region (first material 2) is greater (FIG. 1 left).

However this also suggests that for reaching close tolerances a better matching of the shrinkage behaviour of both powders (materials 2 and 3) is required. Shrinkage differences during the sintering result in a conical deformation of the composite part 1 not only because of the difference in the final shrinkages, in particular of the valve seat ring 4. In particular during different shrinkage maximums (i.e. different shrinkage curves) of the two materials 2, 3 non-reversible deformations are reached which result in larger tolerances even in the case of same final shrinkages. The conicity does not constitute a restriction for proving the function in terms of this invention since the valve seat rings 4 can be produced out of the sinter body by way of machining. Improvements in the sintering process which result in close tolerances can be subject of improvements of this invention.

Figure 2:
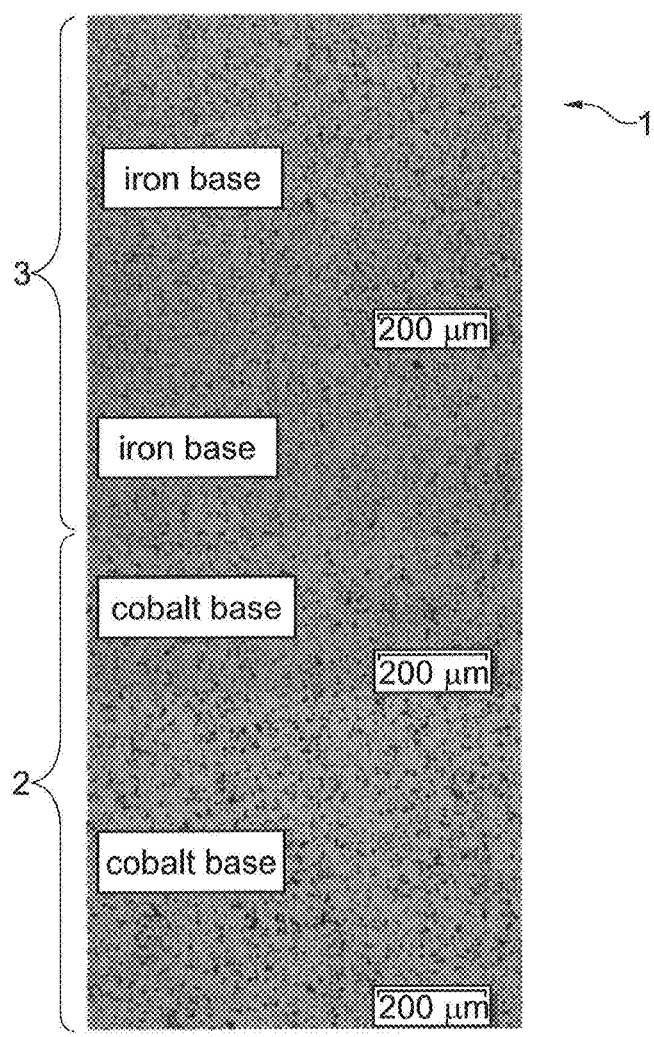
Figure 3:
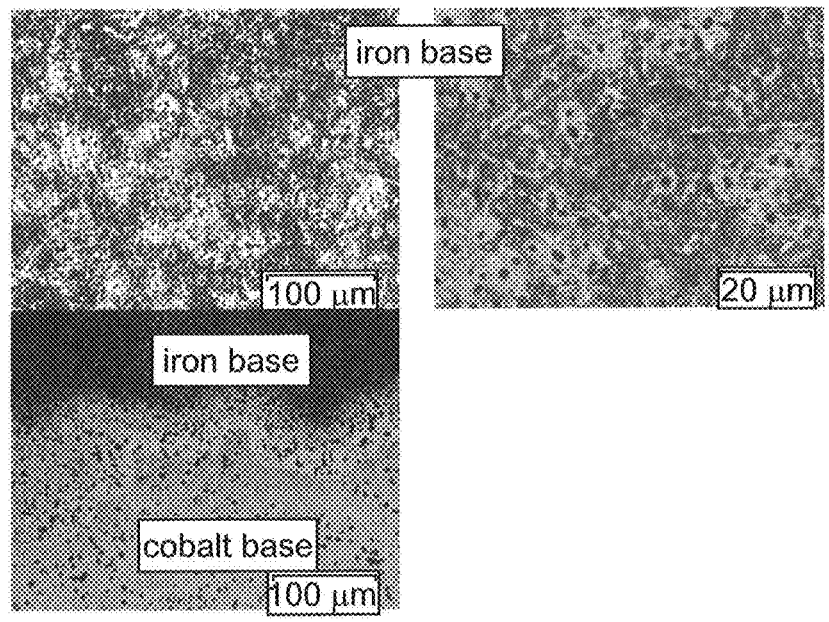

In FIGS. 2 and 3, the structures of the sintered valve seat rings 4 are shown. FIG. 2 shows that the boundary layer between the second material 3 (Fe-based, base material) and the first material 2 (Co-based, function material) is only approximately 50 to 100 µm wide and that the same does not exhibit any damage or critical brittle phases, which for an application under mechanically and thermally changing loads is of special significance. As described above, the composite parts 1 formed as valve seat rings 4 have to be introduced in the cylinder head with an overlap. During the operation, a heat flow runs from the valve/VSR to the cylinder head, which results in a temperature gradient in the VSR4. In a homogeneous component (not according to the invention) the relaxation decreases from the seat region to the support region, the overlap that is measured then in the cold state on the removed VSR increases in the direction of the support region.

Figure 4:
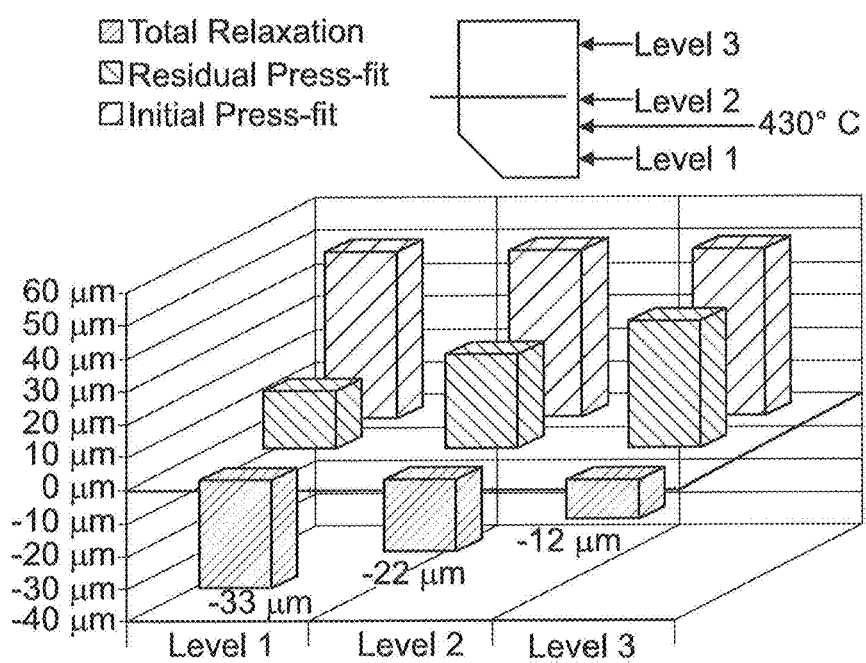

FIG. 4 describes the change at a test temperature of 430° C. on a sintered Co-based first material 2. In the hot region (level 1), the total relaxation with −33 µm is greatest, while of the original overlap of 50 µm 18 µm still remain after the test. In the region of mean temperatures (level 2), the overlap still amounts to 29 µm. At the cold end (level 3), the total relaxation with −12 µm is lowest, correspondingly high is the final overlap.

Figure 5:
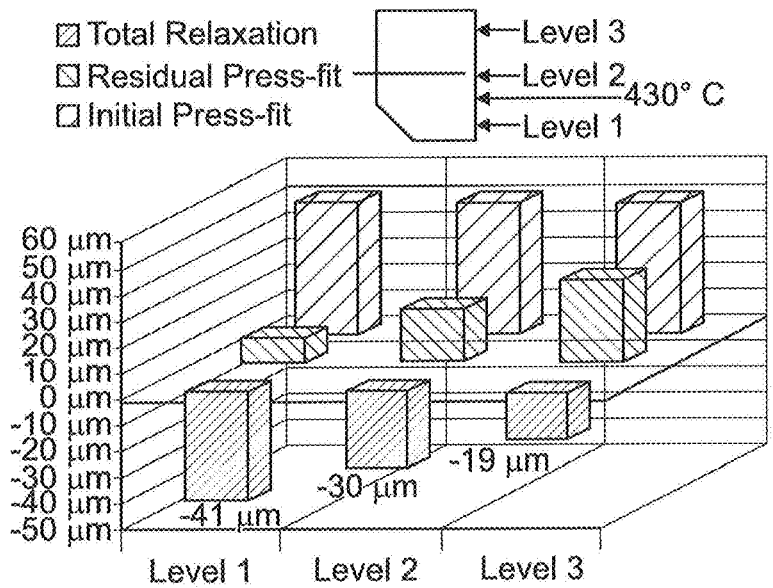

Compared with the sintered first material 2 (FIG. 4), FIG. 5 shows the results with respect to a cast material of same composition. Here, this material surprisingly shows higher relaxation in all measurement positions (hot to cold or level 1 to 3). The final overlap on level 1 (hot) amounts only to 10 µm, in the cold region the overlap after the test (removal) still amounts to 32 µm.

Figure 6:
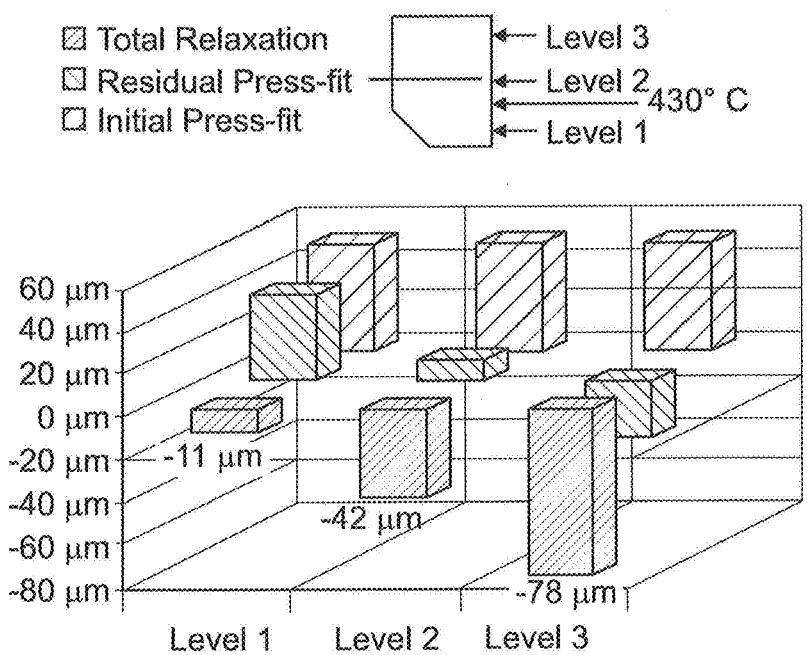

In the case of unsuitable material properties of the Fe-based base material (here) an A17 (material number: 1.4542 or 17-4 PH), shown in FIG. 6, a higher total relaxation was determined in all temperature ranges. In the cold position (level 3), the overlap is lost which is evident from a negative value (−27 µm). Because of the corrosion attack in the gap is critical and likewise with respect to the step-by-step loss of the adhesion in the cylinder head.

The suitable combination (FIG. 7) of sintered materials 2, 3 for the function material 2 (first material here Co-based) and the base material 3 (second material, here special Fe-based material) leads to a reversal of the conditions in the overlap compared with the pure sintered material. The overlap of the first material 2 (function material after the removal) on the cold side (level 1) still amounts to 26 µm compared with 18 µm (FIG. 4) with the pure sintered version and 10 µm with the cast version (FIG. 5). Thus it is ensured that under the chosen experimental conditions in the composite material the function material 2 has a stronger press fit in the cylinder head than the VSR according to the prior art.

Quite in general, the valve seat ring 4 according to the invention can be produced from a first material 2 with approximately 15 to 30% by weight of molybdenum, approximately 5 to 30% by weight of chromium, 0 to 5% by weight of silicon, 0 to 2% by weight of carbon, and up to 5% by weight of other elements and the residual proportion of cobalt, and a second material 3 with 10-12% by weight of Cr, 0.4-0.8% by weight of Mn, 0.5-1% by weight of Si, 0.5-0.9% by weight of C, approximately 3% by weight of other elements and rest Fe, wherein the two materials 2, 3 are initially atomised as metal melt until they have a mean particle size of approximately 5 to 13 µm. The now powdery materials 2, 3 are then each processed into a flowable granulate with a granulate size of substantially smaller than <300 µm, preferentially <150 µm, and of greater than 15 µm, in particular processed by means of fluidised bed granulation, spray drying or screen granulation, wherein a proportion of 1 to 5% by weight of organic pressing additives, which serves as binder between the powder particles and mould lubricant, is introduced as long-chain hydrocarbon (e.g. paraffin). Both granulates are now filled into a press tool one after the other namely first the granulated first material 2 and then the granulated second material 3, and subsequently uniaxially pressed with a pressing pressure (p) of 400<p<700 MPa. The organic pressing additives are removed by heating at 50° C.<t<700° C., wherein the valve seat ring 4 is initially pre-sintered, in particular at a temperature t of 1,110° C.<t<1,130° C., and subsequently finish-sintered, in particular at a temperature t of approximately 1,240° C.

Here, an alloy with 22-24% by weight of Mo, 15-17% by weight of Cr, 0.5-1.5% by weight of Si, 1.5-2.5% by weight of Fe, 0.3-1% by weight of C, approximately 4% by weight of other elements and rest Co can also be used for the first material, in particular even an alloy with 23% by weight of Mo, 16% by weight of Cr, 1% by weight of Si, 2% by weight of Fe, 0.5% by weight of C, approximately 3% by weight of other elements and rest Co.

For the second material 3, a steel with 10-12% by weight of Cr, 0.4-0.8% by weight of Mn, 0.5-1% by weight of Si, 0.5-0.9% by weight of C, approximately 3% by weight of other elements and rest Fe is used, in particular an alloy with 11% by weight of Cr, 0.6% by weight of Mn, 0.7% by weight of Si, 0.7% by weight of C, approximately 2% by weight of other elements and rest Fe.

The granulate is pressed in the press 2 with a pressing pressure p of 520 MPa, wherein the first material 2 is compressed to a density of approximately 5.85 g/m$^3$ and the second material 3 to a density of approximately 5.5 g/cm$^3$. The granulate in the process is pressed in the press tool in such a manner that a relative density of the first material 2 based on the unsintered compact deviates by a maximum of +/−3% from the relative density of the second material 3. The valve seat ring 4 is pre-sintered approximately 25 to 35 minutes in an N2-H2 atmosphere with a proportion of H2 of 5%<H2<20% and finish-sintered approximately 50 to 60 minutes in an N2-H2 atmosphere with a component of H2 of 5%<H2<20%.

Heating up during pre-sintering in this case preferentially takes place with 3 to 5° C./min and cooling down to room temperature with approximately 5 to 10° C./min, whereas heating-up during finish-sintering takes place with 5 to 10° C./min and cooling down to room temperature with approximately 10 to 20° C./min. Here, the valve seat ring 4 is sintered under vacuum up to a temperature of T=1,100° C. in an N2-H2 atmosphere and at a temperature of 1,100° C.<T<1.240° C.

The valve seat ring 4 according to the invention produced in this manner has the following properties in a temperature range between −40° C.<T<600° C., a heat expansion of 8.0-19.5 μm/mK, a modulus of elasticity of 150-250 GPa and a compressive yield strength of 900-2000 MPa. In addition to this, the valve seat ring 4 has a linear shrinkage in the region of the first material 2 in an axial direction which maximally amounts to +/−2% of a linear shrinkage in the region of the second material 3.

The invention claimed is:

1. A method for producing a valve seat ring, comprising:
providing a first material composed of approximately 15 to 30% by weight of molybdenum, approximately 5 to 30% by weight of chromium, approximately 0 to 5% by weight of silicon, approximately 0 to 2% by weight of carbon, and up to 5% by weight of other elements and a remainder of cobalt, and a second material composed of approximately 10 to 12% by weight of chromium, approximately 0.5 to 0.8% manganese, approximately 0.5 to 1% by weight of silicon, approximately 0.5 to 0.9% by weight of carbon, up to approximately 3% by weight of other elements and a remainder of iron,
processing the first materials and the second material to form a powder by atomising a metal melt so that the first material and the second material have a mean particle size of approximately 5 to 13 μm,
processing the powder of each of the first material and the second material into a flowable granulate with a granulate size of substantially smaller than 300 μm and greater than 15 μm,
admixing a proportion of 1 to 5% by weight of an organic pressing additive,
filling the granulate of the first material and of the second material into a press tool one after the other and subsequently uniaxially pressing the granulate in the press tool with a pressing pressure of 400<p<700 MPa,
removing the organic pressing additive by heating at a temperature 50° C.<t<700° C., and
performing at least one of a pre-sintering and finish-sintering.

2. The method according to claim 1, wherein the pre-sintering is performed at a temperature of 1,110° C.<t<1,130° C. and the finish-sintering is performed at a temperature of approximately 1,240° C.

3. The method according to claim 1 wherein processing the powder of each of the first material and the second material includes at least one of fluidised bed granulation, spray drying and screen granulation.

4. The method according to claim 1, wherein the first material includes an alloy having 22-24% by weight of Mo, 15-17% by weight of Cr, 0.5-1.5% by weight of Si, 1.5-2.5% by weight of Fe, 0.3-1% by weight of C, approximately 4% by weight of other elements and a remainder of Co.

5. The method according to claim 1, wherein the second material includes a steel having 10-12% by weight of Cr, 0.4-0.8% by weight of Mn, 0.5-1% by weight of Si, 0.5-0.9% by weight of C, approximately 3% by weight of other elements and the remainder of Fe.

6. The method according to claim 1, wherein the first material includes an alloy having 23% by weight of Mo, 16% by weight of Cr, 1% by weight of Si, 2% by weight of Fe, 0.5% by weight of C, approximately 3% by weight of other elements and a remainder of Co.

7. The method according to claim 1, wherein the second material includes an alloy having 11% by weight of Cr, 0.6% by weight of Mn, 0.7% by weight of Si, 0.7% by weight of C, approximately 2% by weight of other elements and the remainder of Fe.

8. The method according to claim 1, wherein pressing the granulate in the press tool includes compressing the granulate with a pressing pressure of 520 MPa, wherein the granulate of the first material is compressed to a density of approximately 5.85 g/m$^3$ and the granulate of the second material is compressed to a density of approximately 5.5 g/cm$^3$.

9. The method according to claim 1, wherein pressing the granulate in the press tool includes compressing the granulate in such a manner that a relative density of the first material before sintering deviates by a maximum of +/−3% from a relative density of the second material.

10. The method according to claim 1, wherein performing the pre-sintering is for approximately 25 to 35 minutes in an N2-H2 atmosphere with a proportion of H2 to 5%<H2 <20%.

11. The method according to claim 1, wherein performing the finish-sintering is for approximately 50 to 60 minutes in an N2-H2 atmosphere with a proportion of H2 of 5%<H2 <20%.

12. The method according to claim 1, wherein performing the pre-sintering includes heating to a predetermined temperature at 3 to 5° C./min and cooling to room temperature at approximately 5 to 10° C./min.

13. The method according to claim 1, wherein performing the finish-sintering includes heating to a predetermined temperature at 5 to 10° C./min and cooling to room temperature at approximately 10 to 20° C./min.

14. The method according to claim 1, wherein performing the at least one of the pre-sintering and the finish-sintering includes heating to a temperature of 1,100° C. in an N2-H2 atmosphere and at a temperature of 1,100° C.<T<1,240° C. under vacuum.

15. The method according to claim 1, wherein the granulate size is smaller than 150 μm and greater than 15 μm.

\* \* \* \* \*